(12) United States Patent
Khot et al.

(10) Patent No.: US 8,717,409 B2
(45) Date of Patent: May 6, 2014

(54) CONDUCTING A DIRECT PRIVATE VIDEOCONFERENCE WITHIN A VIDEOCONFERENCE

(75) Inventors: Gautam Khot, Bangalore (IN); Hrishikesh G. Kulkarni, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 791 days.

(21) Appl. No.: 12/779,686

(22) Filed: May 13, 2010

(65) Prior Publication Data

US 2011/0279629 A1 Nov. 17, 2011

(51) Int. Cl.
*H04N 7/14* (2006.01)
(52) U.S. Cl.
USPC ................................. 348/14.09; 348/14.13
(58) Field of Classification Search
CPC ...................................................... H04N 7/152
USPC ............. 379/202.01, 204.01, 205.01, 207.01; 348/14.01–14.14; 370/260–266
See application file for complete search history.

(56) References Cited

U.S. PATENT DOCUMENTS

| | | | |
|---|---|---|---|
| 7,346,654 B1 | 3/2008 | Weiss | |
| 7,404,001 B2 | 7/2008 | Campbell et al. | |
| 7,480,259 B2 | 1/2009 | Covell et al. | |
| 7,656,824 B2 * | 2/2010 | Wang et al. | 370/262 |
| 7,679,640 B2 * | 3/2010 | Eshkoli et al. | 348/14.09 |
| 8,390,669 B2 * | 3/2013 | Catchpole et al. | 348/14.08 |
| 2005/0013309 A1 * | 1/2005 | Ravishankar et al. | 370/401 |
| 2005/0128283 A1 * | 6/2005 | Bulriss et al. | 348/14.1 |

OTHER PUBLICATIONS

B. Rosen and A. Johnston; "SIP Conferencing: Sub-conferences and Sidebars"; Jul. 16, 2004; 15 pages; Received from Internet: <http://tools.ietf.org/html/draft-rosen-xcon-conf-sidebars-01>.

O. Levin and R. Even; "High-Level Requirements for Tightly Coupled SIP Conferencing"; Nov. 2005; 11 pages; Received from Internet: <http://www.faqs.org/rfc/rfc4245.txt>.

* cited by examiner

*Primary Examiner* — Fan Tsang
*Assistant Examiner* — Akelaw Teshale
(74) *Attorney, Agent, or Firm* — Meyertons Hood Kivlin Kowert & Goetzel, P.C.; Jeffrey C. Hood; Joel L. Stevens (57) ABSTRACT

Conducting a private videoconference within a videoconference. A videoconference may be established between a plurality of endpoints. Input may be received requesting the private videoconference for a plural subset of the plurality of endpoints. The private videoconference may be established between the plural subset of the plurality of endpoints. The initial videoconference may continue during the private videoconference. Private videoconference data may be transmitted only to the plural subset of endpoints of the private videoconference. The private videoconference may be sent directly between the plural subset of endpoints or may be sent via a multipoint control unit, e.g., of the initial videoconference. The private videoconference data may not be sent to the remaining endpoints of the initial videoconference.

18 Claims, 10 Drawing Sheets

CONDUCTING A DIRECT PRIVATE VIDEOCONFERENCE WITHIN A VIDEOCONFERENCE

FIELD OF THE INVENTION

The present invention relates generally to conferencing and, more specifically, to conducting a private videoconference within a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants (optionally through an MCU). Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

In some cases, during a videoconference, some of the participants may wish to discuss a topic between themselves, e.g., privately. Using current videoconferencing systems, such participants might have to resort to offline methods, such as email, chat, or cell phones. Accordingly, improvements in videoconferencing are desired.

SUMMARY OF THE INVENTION

Various embodiments are presented of a system and method for conducting a private videoconference within a first videoconference.

A first (or main) videoconference between a plurality of videoconference endpoints may be initially performed. For example, a multipoint control unit (MCU) may perform decoding and encoding operations on video information transmitted in the first videoconference between the plurality of videoconferencing endpoints.

Input requesting the private conference for a plural subset of the plurality of endpoints may be received during the first videoconference. The plural subset may comprise a first endpoint and one or more second endpoints, and is not the entirety of the plurality of endpoints. In some embodiments, the input may be received from a first endpoint of the first videoconference (e.g., from a user via a graphical user interface (GUI) of the first endpoint).

Correspondingly, the private videoconference may be initiated between the plural subset of the plurality of videoconference endpoints. However, the initiation (and subsequent performance) of the private videoconference does not end the first videoconference.

During the private videoconference, first videoconference information may be transmitted from the first endpoint directly to the second one or more endpoints of the plural subset. As used herein, the "direct" transmission from the first videoconference endpoint to the second one or more endpoints during the private videoconference is direct in the sense that it is not transmitted to or via a controlling unit (e.g., the MCU) of the first videoconference. However, the transmission may still be direct if it is sent via one or more other devices, e.g., network devices, such as routers, gateways, etc. Thus, the "direct" transmission bypasses the MCU of the first videoconference.

Also during the private conference, a remaining subset of the plurality of endpoints may continue transmitting videoconference data in the first (or main) videoconference. For example, the MCU may continue to perform decoding and encoding for the remaining subset of the plurality of endpoints. The videoconference data of the plural subset is not transmitted to the remaining subset.

In some embodiments, the remaining subset of videoconferencing endpoints may display text or a static image for at least one of the plural subset of videoconferencing endpoints during the private videoconference. More specifically, one or more portions of the display which were previously dedicated to participants which are now in the private videoconference may have the text or static images displayed. For example, the text "private" or a static image of the participant or participant location (or other image) may be displayed in the corresponding portion of the display.

The private videoconference may be ended between the plural subset of the plurality of endpoints. Correspondingly, the plural subset of endpoints may be rejoined with the remaining subset in the first videoconference.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1:
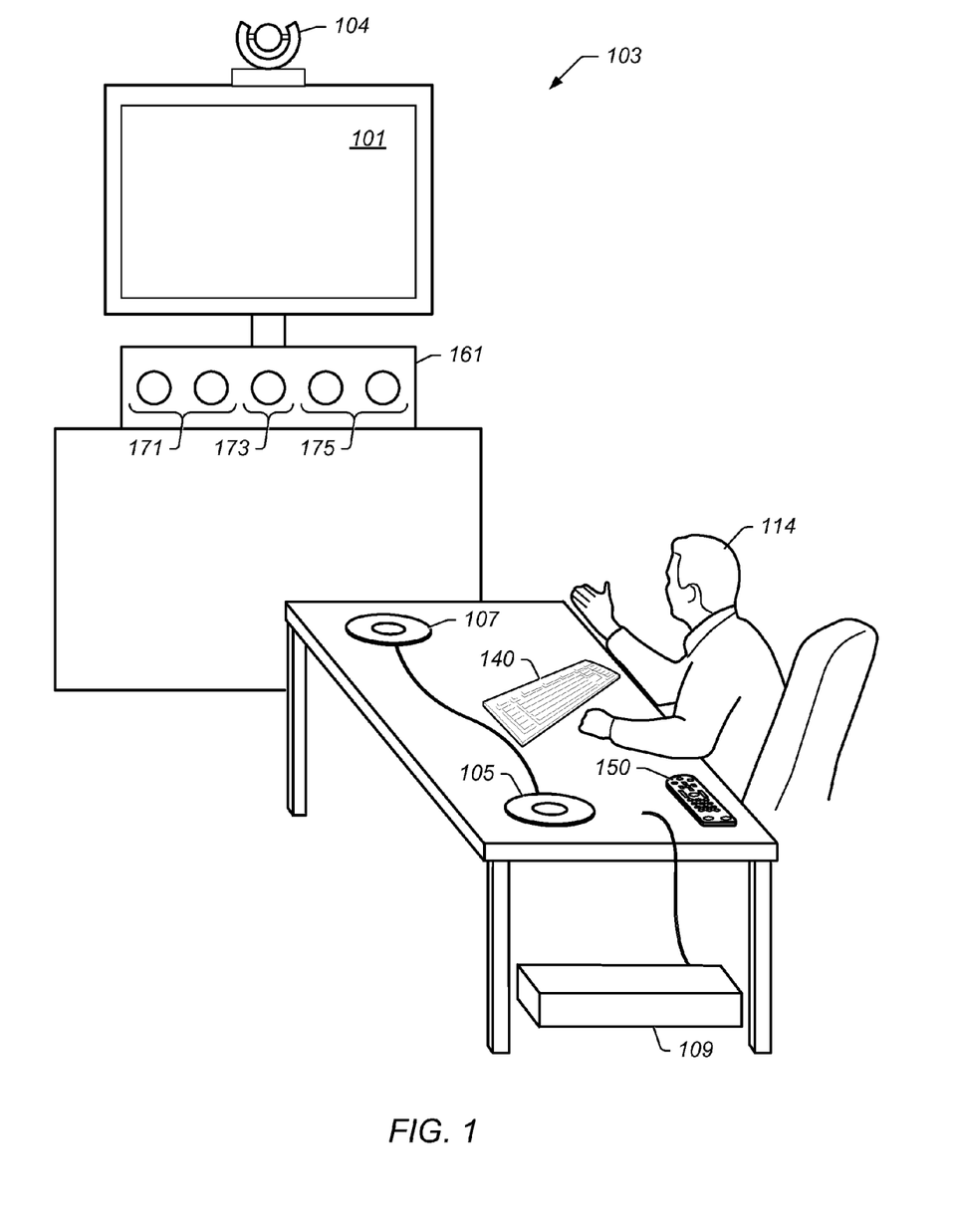
FIGS. 1 and 2 illustrate exemplary videoconferencing system participant locations, according to an embodiment.
Figure 2:
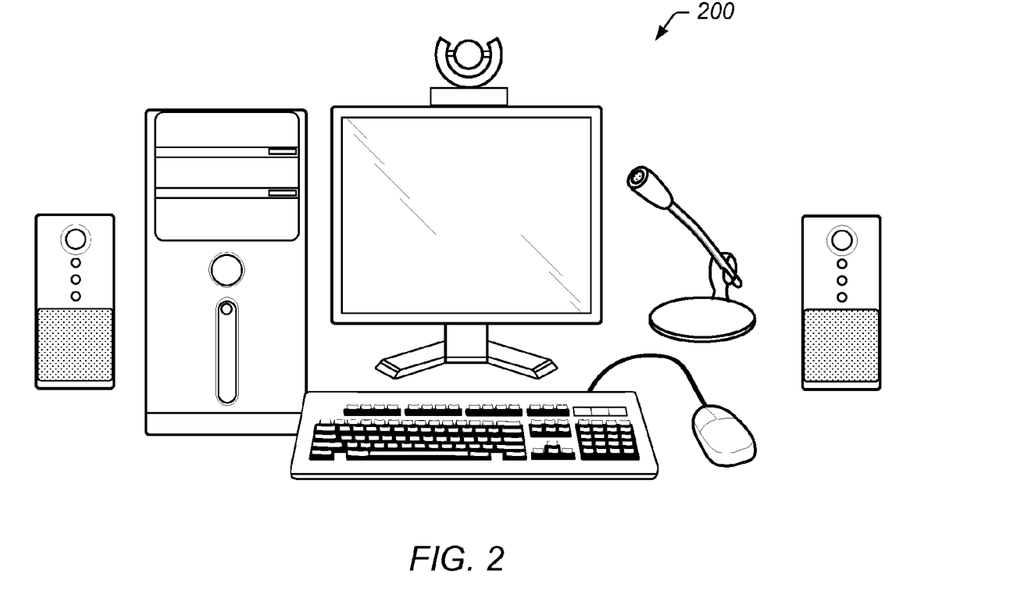

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. For example, the conference may be a teleconference, where at least a subset or all of the participants are called using telephone numbers. Alternatively, the audioconference could be performed over a network, e.g., the Internet, using VoIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
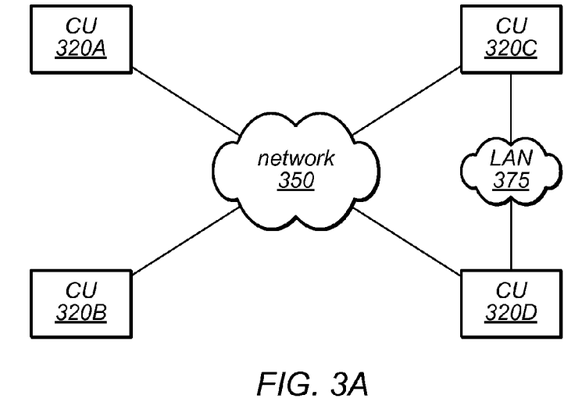
FIGS. 3A and 3B illustrate exemplary conferencing systems coupled in different configurations, according to some embodiments.
Figure 3B:
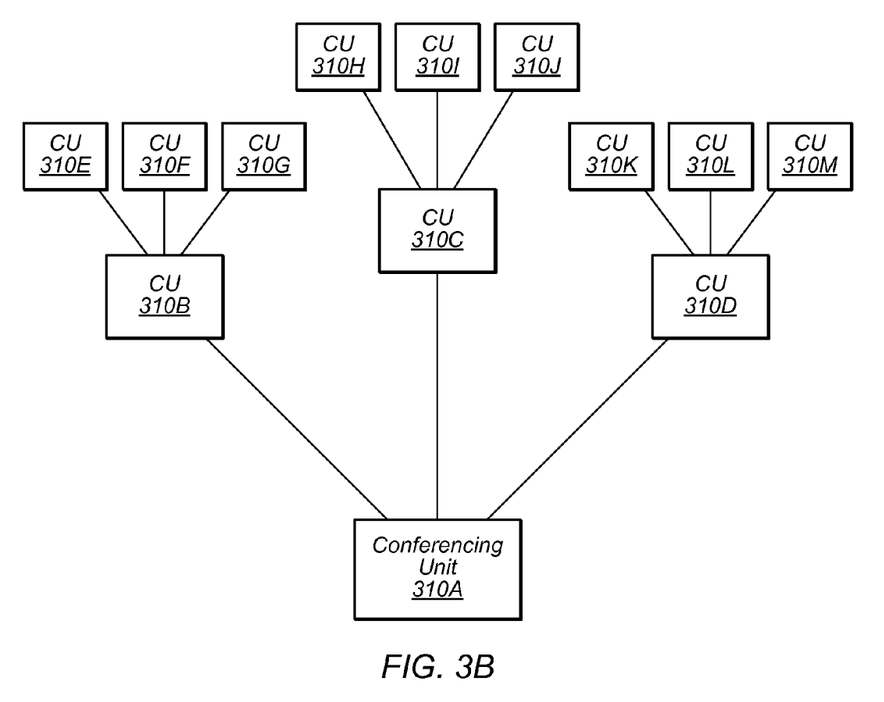

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Private Videoconferences

In a first embodiment, the private videoconference is facilitated by the multipoint control unit (MCU) that hosts the main videoconference. In a second embodiment, the private videoconference is implemented with direct transmission among the private participant endpoints, without use of the MCU that hosts the main videoconference.

Figure 4A:
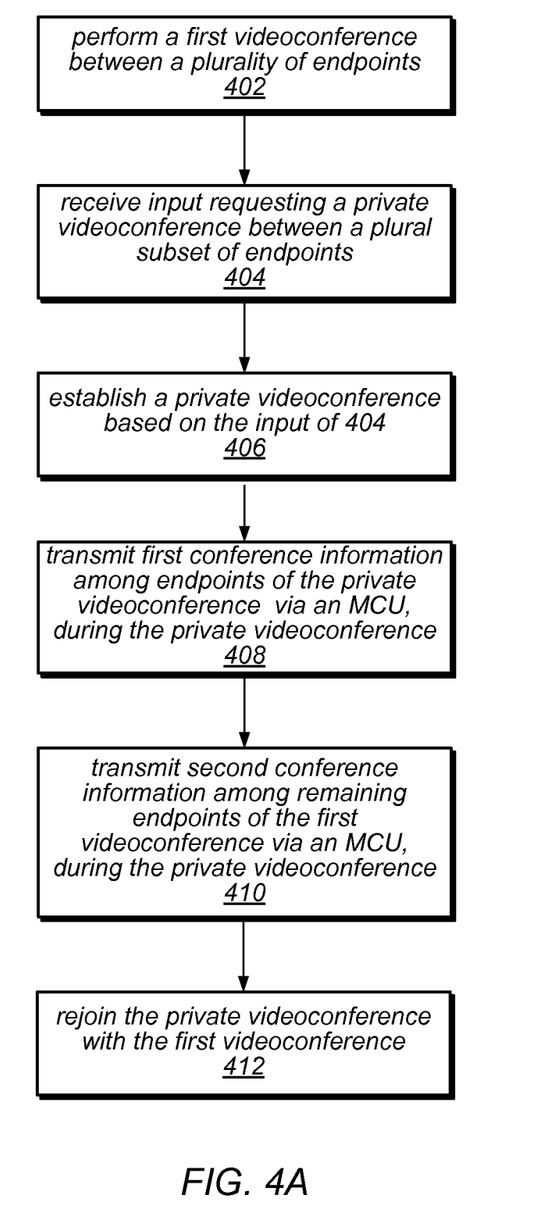
FIGS. 4A and 4B are flowchart diagrams illustrating embodiments of a method for conducting a private videoconference within a first videoconference.

FIG. 4A—Private Videoconference Using an MCU

FIG. 4A illustrates a method for performing a private videoconference within a first (or main) videoconference using an MCU. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a videoconference may be initiated or performed between a plurality of participants at respective participant locations. More specifically, the videoconference may be initiated between a first participant using a first endpoint (e.g., at a first participant location) and a plurality of other participants using other endpoints (e.g., at other participant locations). Thus, endpoints may be similar to those described above regarding FIGS. 1 and 2, although other variations are envisioned. The videoconference may be established according to any of a variety of methods, e.g., the one described in patent application Ser. No. 11/252,238, which was incorporated by reference above. The videoconference may utilize an instant messaging service or videoconferencing service over the Internet, as desired.

In some embodiments, a multipoint control unit (MCU) may perform the first videoconference between the plurality of videoconference endpoints. For example, the MCU may perform decoding and encoding operations on video information transmitted in the first videoconference between the plurality of videoconference endpoints.

Figure 5A:
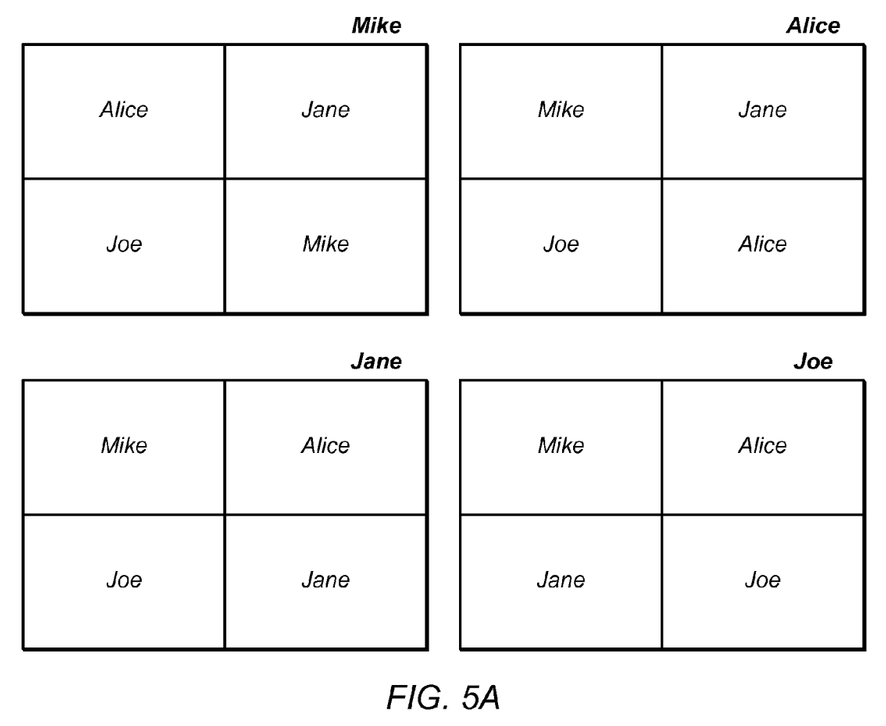
FIGS. 5A and 5B are exemplary block diagrams illustrating potential layouts for members of a first videoconference, according to one embodiment.
Figure 5B:
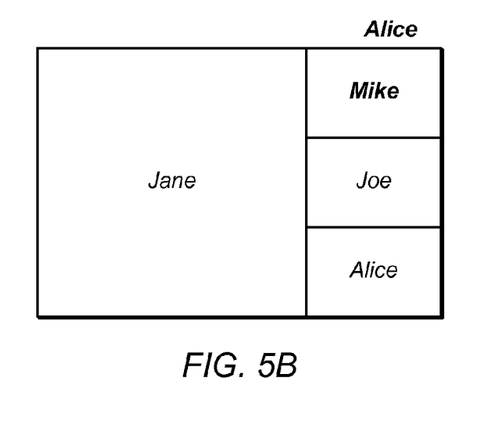

FIG. 5A illustrates exemplary screen layouts for four participants of a videoconference. As shown, the videoconference of FIG. 5A includes four participants, Mike, Alice, Jane, and Joe. Each corresponding screen of FIG. 5A illustrates a four quadrant layout where each participant is able to see the other participants and himself, or potentially auxiliary video (e.g., of his computer screen, a presentation, etc.). FIG. 5B illustrates a different display layout for Alice, where Jane is given the majority of the screen and the other participants are shown smaller (e.g., including herself). This layout may be used so that active talkers (in this case Jane) may be preferentially given more of the display screen. Note that the participants may be able to select either layout, or another layout, as desired.

In 404, input may be received, during the first videoconference, which requests a private videoconference for a plural subset of the plurality of videoconference endpoints. The plural subset is not the entirety of the plurality of videoconference endpoints in the videoconference. In some embodiments, the input may be received from a first endpoint of the first videoconference (e.g., from a user via a graphical user interface (GUI) of the first endpoint). For example, the first participant at the first participant location may use a remote (e.g., a far end button on the remote) to request a private videoconference with a second participant of the first videoconference. Alternatively, the first participant may request the private videoconference in other ways, e.g., using a mobile device, a computer system, etc. The other potential participant(s) of the private videoconference may see a message on their display indicating the request for the private videoconference. The request may indicate the participant who requested the private videoconference, as well as the other participants, if any, to whom the request was made. The other potential participant(s) of the private videoconference may be able to accept the invitation, e.g., using their remotes, or other methods.

Figure 6:
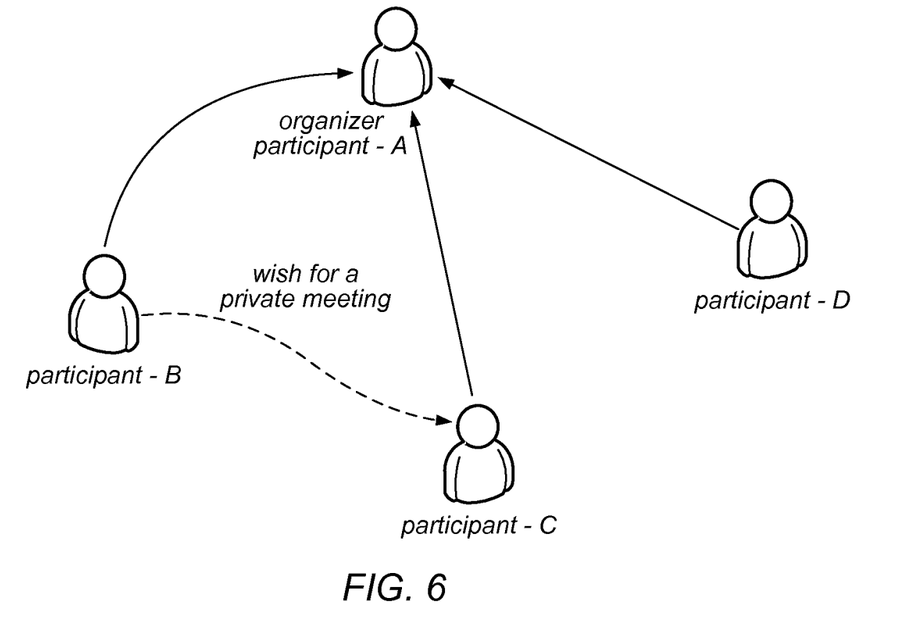
FIG. 6 illustrates the flow of information in a request for a private videoconference, according to one embodiment.

FIG. 6 illustrates an exemplary diagram of a videoconference where communication is transmitted from participants B, C, and D, to participant A, who is the organizer. In this embodiment, the endpoint of participant A may perform MCU functionality for the videoconference. As shown, participant B may wish for a private meeting or videoconference with participant C. In this example, participant B may provide input to their endpoint, which may in turn provide signals indicating such a request to the MCU, e.g., in this example the endpoint for participant A, which is acting as the MCU. The MCU may then forward the request to the endpoint of participant C. Participant C may then provide input accepting the private videoconference.

Correspondingly, in 406, the private videoconference may be initiated between the plural subset of the plurality of videoconference endpoints. However, the initiation (and subsequent performance) of the private videoconference does not end the first videoconference.

During the private videoconference, in 408, the MCU may transmit videoconference information among the plural subset of endpoints (among the private participants). For example, the MCU may transmit first videoconference information from the first videoconference endpoint of the plural subset to one or more second videoconference endpoints of the plural subset to conduct the private videoconference. In some embodiments, the MCU may not encode and decode the first videoconference information.

Additionally, during the private videoconference, in 410, the MCU may transmit videoconference information among the remaining subset of endpoints to conduct the first (main) videoconference. In other words, the main videoconference continues for those participants who are not part of the private videoconference. For example, the MCU may transmit second videoconference information from a first videoconference endpoint of a remaining subset of endpoints to one or more second videoconference endpoints of the remaining subset to conduct the first videoconference. The MCU may encode and decode the second videoconference information. However, the first videoconference information of the plural subset (the private videoconference) is not transmitted to the remaining subset (the main videoconference). In one embodiment, the second videoconference information of the remaining subset (the main videoconference) is not transmitted to the plural subset (the private videoconference). However, in alternate embodiments, the MCU may also transmit the second videoconference information (the content of the main videoconference) to the plural subset (i.e., to the participants of the private videoconference). Thus, in this embodiment the participants of the private videoconference see each other as well as content of the main videoconference, but of course the participants of the main videoconference do not see the content of the private videoconference. In one embodiment, the plural subset of endpoints (the private videoconference participants) see the videoconferencing information of the main videoconference in a portion of their display, so that they can be assured that their private videoconference is in fact private.

In some embodiments, the remaining subset of videoconferencing endpoints may display text or a static image for at least one, and possibly all, of the plural subset of videoconferencing endpoints during the private videoconference. More specifically, one or more portions of the display which were previously dedicated to participants which are now in the private videoconference may have the text or static images displayed. For example, the text "private" or a static image of the participant or participant location (or other image) may be displayed in the corresponding portion of the display. In one embodiment, the text or static image may visually indicate which of the endpoints/participants are participating in the private conference. In some embodiments, this overlay or substitution be performed by the MCU. Additionally, the MCU may store state information to keep track of the state of each of the endpoints, e.g., pertaining to which videoconference each one is in, in order to perform correct encoding/decoding/transmission.

Figure 7:
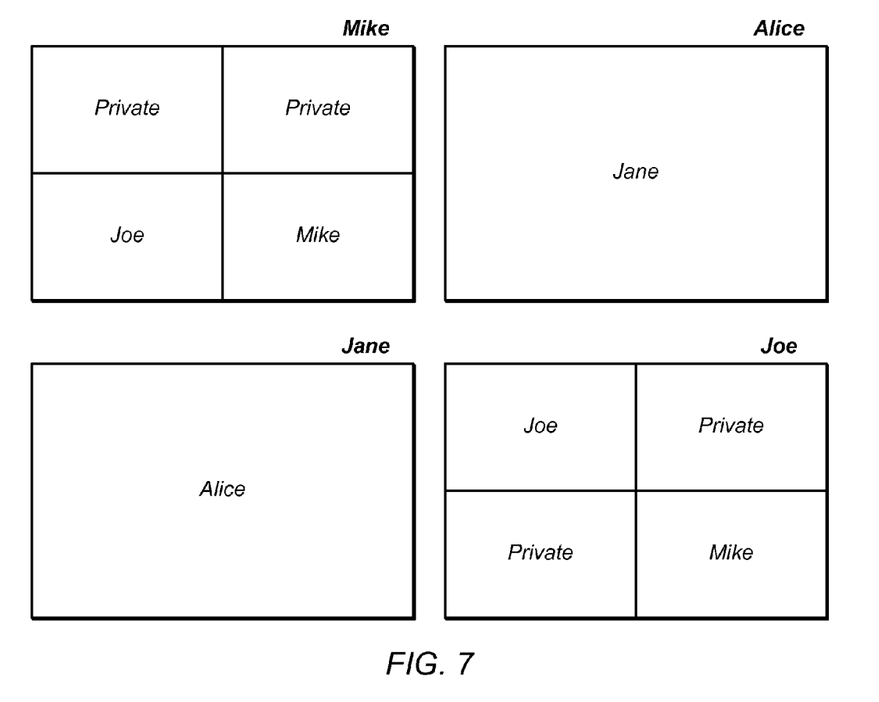
FIG. 7 is an exemplary block diagram illustrating potential layouts for members of a private videoconference and a first videoconference.

FIG. 7 illustrates exemplary screen layouts for the participants of FIGS. 5A and 5B during the private videoconference. As shown, the private videoconference is between Alice and Jane, which, in one embodiment, may only see each other. However, it should be noted that in alternate embodiments, Alice and Jane may continue to see (e.g., but not hear, or at least at a lower volume) the other participants, Joe and Mike. As also shown, Mike and Joe may continue the first videoconference, but may not see or hear Alice and Jane. Instead, in the embodiment shown, the text "private" may be displayed for the corresponding portions for Alice and Jane on Mike and Joe's displays. Thus, during the private videoconference Alice and Jane may privately discuss matters while Mike and Joe continue the first videoconference.

Figure 8:
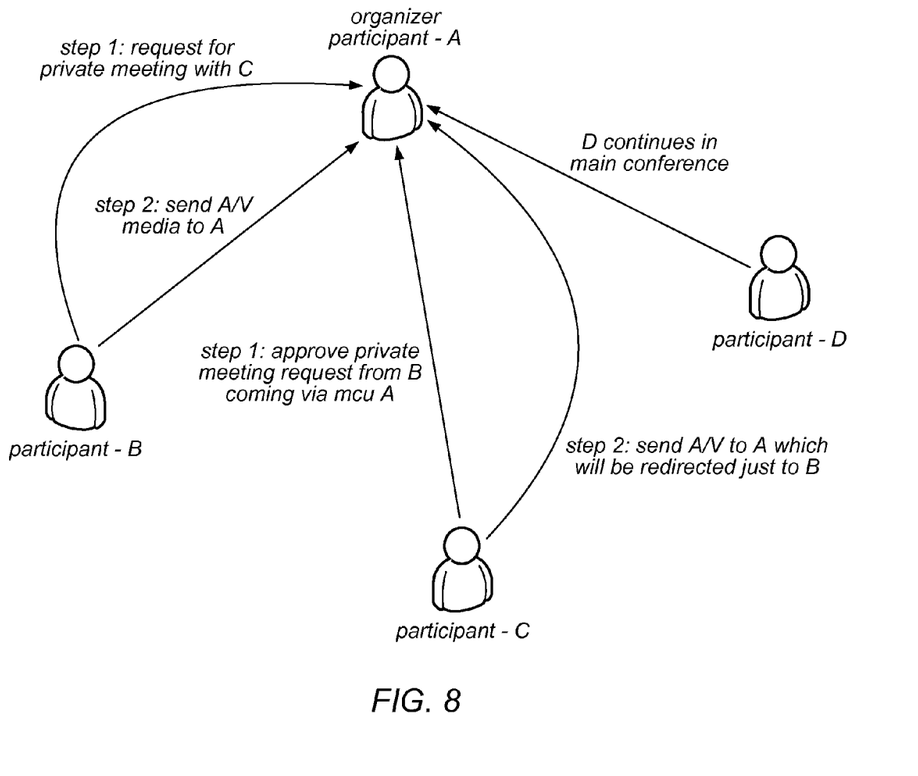
FIG. 8 illustrates the flow of information during a private videoconference according to the embodiment of FIG. 4A.

FIG. 8 illustrates a diagrammatic representation of one embodiment of the method of FIG. 4A. As shown, there is a videoconference between four participants: A (organizer with MCU functionality), B, C, and D. During the videoconference, participant B requests a private meeting with C and the private meeting request is approved from participant C via the MCU at A.

The MCU at A may accept the meeting start request from Jane with Alice's address. The MCU may also maintain a record which sets the state of Jane and Alice as being in meeting-in-meeting. The MCU may signal to Self to not decode the Video and Audio from B. The MCU may signal to Self to forward the Video and Audio from B endpoint to C. The MCU may signal to Self to not decode the Video and Audio from C. The MCU may signal to Self to forward the Video and Audio from C to B. The MCU may finally signal to Self to insert/overlay a note or an icon on the quadrant representing B and C's image in the 4-way composite image. This note could say "Private". Thus, the private meeting or videoconference is established and A/V data from participant B is sent to A and similarly, A/V data from participant C is sent to A. This A/V data is redirected just to C and B respectively (and not to A or D), e.g., without being mixed, decoded, or encoded. During the private meeting, D continues in the main conference by sending A/V data to A. Additionally, A may continue to generate a composite image for A and D and send the composite image to D. A may also display the composite image. D and A may continue to send their audio to each other. Where there are more than two participants remaining, the MCU may perform normal audio mixing for the remaining participants. In some embodiments, A may continue sending A/V data to C and B corresponding to A and D, but this is not required. During the private videoconference, the screen layouts of the participants may be similar to that shown in FIG. 7.

In one embodiment, to end the private videoconference, the MCU may accept the meeting end request from B or C. The MCU may signal to Self to decode and composite Video and mix Audio from C. The MCU may signal to Self to decode and composite Video and mix Audio from B. The MCU may signal to Self to remove the note or an icon on the quadrant representing B and C's image in the 4-way composite image. These quadrants will have the live video from B and C. The MCU may delete or update the record which had the state of B and C as being in meeting-in-meeting. After ending the private videoconference, the screen layouts of the participants may be similar to that of FIGS. 5A and 5B.

Thus, in 412, the private videoconference may be ended between the plural subset of the plurality of endpoints. Correspondingly, the plural subset of endpoints may be rejoined with the remaining subset in the first videoconference, and the first videoconference may continue with the plurality of endpoints, and the first videoconference may be performed normally, as in 402 above. The private videoconference may be ended by one or more of the private participants, e.g., using a remote or other input device.

Figure 4B:
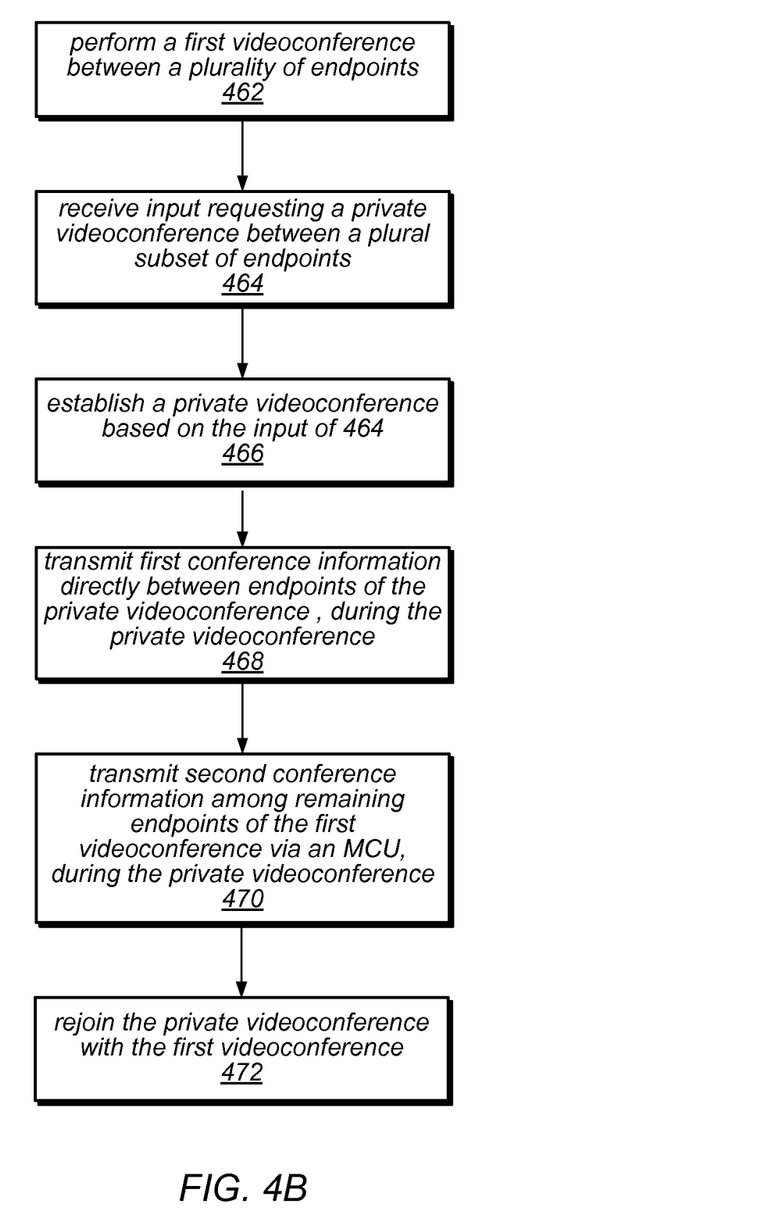

FIG. 4B—Private Videoconference Using an Direct Transfer

FIG. 4B illustrates a method for performing a private videoconference within a first videoconference using direct transfer. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 462, similar to 402 above, a first videoconference between a plurality of videoconference endpoints may be initially performed. For example, a multipoint control unit (MCU) may perform decoding and encoding operations on video information transmitted in the first videoconference between the plurality of videoconferencing endpoints.

In 464, similar to 404 above, input requesting the private conference for a plural subset of the plurality of endpoints may be received during the first videoconference. The plural subset may consist of a first endpoint and one or more second endpoints, and is not the entirety of the plurality of endpoints. In some embodiments, the input may be received from a first endpoint of the first videoconference (e.g., from a user via a graphical user interface (GUI) of the first endpoint).

Correspondingly, in 466, similar to 406 above, the private videoconference may be initiated between the plural subset of the plurality of videoconference endpoints. However, the initiation (and subsequent performance) of the private videoconference does not end the first videoconference.

During the private videoconference, in 468, first videoconference information may be transmitted from the first endpoint directly to the second one or more endpoints of the plural subset. As used herein, the "direct" transmission from the first videoconference endpoint to the second one or more endpoints during the private videoconference is direct in the sense that it is not transmitted to or via a controlling unit (e.g., the MCU) of the first videoconference. However, the transmission may still be direct if it is sent via one or more other devices, e.g., network devices, such as routers, gateways, etc. Thus, the "direct" transmission bypasses the MCU of the first videoconference.

Also during the private conference, in 470, similar to 410 above, a remaining subset of the plurality of endpoints may continue transmitting videoconference data in the first conference. For example, the MCU may continue to perform decoding and encoding for the remaining subset of the plurality of endpoints. The videoconference data of the plural subset is not transmitted to the remaining subset.

In some embodiments, as indicated above, the remaining subset of videoconferencing endpoints may display text or a static image for at least one of the plural subset of videoconferencing endpoints during the private videoconference. More specifically, one or more portions of the display which were previously dedicated to participants which are now in the private videoconference may have the text or static images displayed. For example, the text "private" or a static image of the participant or participant location (or other image) may be displayed in the corresponding portion of the display.

Figure 9:
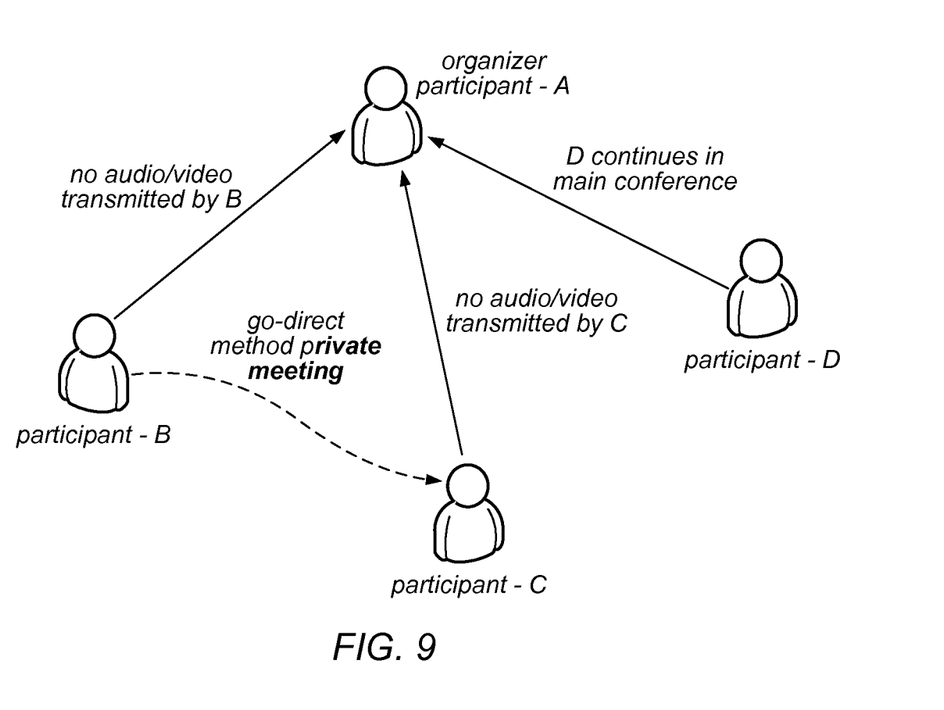
FIG. 9 illustrates the flow of information during a private videoconference according to the embodiment of FIG. 4B.

FIG. 9 illustrates a diagrammatic representation of one embodiment of the method of FIG. 4B. As shown, there is a videoconference between four participants: A (organizer with MCU functionality), B, C, and D. During the videoconference, participant B requests a private meeting with C. The request may be received via the MCU at A or independently, as desired.

For example, the MCU at A may accept the meeting start request from B with C's address. The MCU may maintain a record which sets the state of B and C as being in a private videoconference (or meeting-in-meeting). The MCU may signal to C to redirect the video and audio to B. The MCU may signal to B to redirect the video and audio to C. The MCU may signal to Self to insert/overlay a note or an icon on the quadrant representing B and C's image in the 4-way composite image. This note could say "Private". The MCU may signal to Self to not send video and audio media to B and C. Thus, the private meeting or videoconference is established and A/V data from participant B is sent to C without being sent to A and similarly, A/V data from participant C is sent to B without being sent to A. During the private meeting, D continues in the main conference by sending A/V data to A. Additionally, A may continue to generate a composite image for A and D and send the composite image to D. A may also display the composite image. D and A may continue to send their audio to each other. Where there are more than two participants remaining, the MCU may perform normal audio mixing for the remaining participants. However, note that in some embodiments, A may continue sending A/V data to C and B corresponding to A and D, but this is not required. During the private videoconference, the screen layouts of the participants may be similar to that shown in FIG. 7.

In one embodiment, to end the private videoconference, the MCU may accept the meeting end request from B or C. The MCU may signal to C to redirect the video and audio to A. The MCU may signal to B to redirect the video and audio to A. The MCU may signal to Self to remove the note or an icon on the quadrant representing B and C's image in the 4-way composite image. These quadrants will have the live video from B and C. The MCU may signal to Self to send video and audio media to B and C. Finally, the MCU may delete the record which had the state of B and C as being in a private meeting. After ending the private videoconference, the screen layouts of the participants may be similar to that of FIGS. 5A and 5B.

Thus, in 472, similar to 412, the private videoconference may be ended between the plural subset of the plurality of endpoints. Correspondingly, the plural subset of endpoints may be rejoined with the remaining subset in the first videoconference, and the first videoconference may be performed normally, as in 402 or 452 above. The private videoconference may be ended by one or more of the private participants, e.g., using a remote or other input device.

Further Embodiments

In some embodiments, following any of the methods described above, the endpoints of the private videoconference may receive the videoconferencing data of the remaining participants/endpoints. Thus, by seeing this videoconferencing data, participants of the private videoconference can be assured that their videoconference is truly private, and are thus free to discuss matters that the other members potentially should not hear.

Note that in some embodiments, participants at the same participant location may wish to conduct a private videoconference separate from other participants at the location. In such cases, separate computer systems or videoconferencing systems may be required to achieve the desired functionality.

Additionally, while the above embodiments discussed the routing and encoding of video and audio data to achieve the private videoconference, in some embodiments, only the audio data may be affected. For example, during a private videoconference, the video may be displayed for participants of the private videoconference, but the audio data may be muted or not transmitted to the other participants, thereby masking what is being discussed in the private video conference. In some embodiments, the participants themselves may be able to choose between only masking the audio or masking both the audio and video.

Further, the participants may be able to choose from a wide variety of layouts prior to or during the private videoconference, e.g., from the ones shown in FIGS. 5A and 5B, or others. For example, the layout that is shown to the private participants can continue to show the other participants and maximize the private participant as an option. Alternatively, or additionally, for the remaining participants, the layout can block the view of the private participants and show a message that these parties are having a private conversation. This choice may be an implementation specific choice or a participant level choice.

Advantages of the Method

As indicated in the background, previous methods required users to conduct private conversations using other means, such as cell phones or instant messaging. However, using the methods described above for conducting a private videoconference, members can decide to have a conference which needs to be private (e.g., that the other members do not wish to or should not hear), they are not required to use offline methods or leave the videoconference entirely. Additionally, the remaining participants are not affected or intimated about the ongoing private videoconference and can continue the first videoconference, thereby providing a seamless flow for creating private conferences and rejoining the main conference.

Additionally, using the method of FIG. 4A, network visibility challenges are avoided that may exist between the two endpoints that are planning to have the private conversation.

Thus, the private videoconferences described above can alleviate the necessity to have PCs in a meeting where users will have to IM each other so as not to disturb the other participants in the meeting. Additionally, participants need not leave the current meeting in order to have a private conversation with other participants who are physically located at a different location.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer accessible memory medium storing program instructions for conducting a private videoconference within a first videoconference, wherein the program instructions are executable to:

perform the first videoconference between a plurality of endpoints;

receive input requesting the private videoconference for a plural subset of the plurality of endpoints, wherein the plural subset consists of a first endpoint and one or more second endpoints, wherein the plural subset is not the entirety of the plurality of endpoints, and wherein the input is received during the first videoconference;

initiate the private videoconference between the plural subset of the plurality of endpoints, wherein said initiating the private videoconference does not end the first videoconference;

transmit first videoconference information directly to the second one or more endpoints of the plural subset during the private videoconference, wherein during the private videoconference, a remaining subset of the plurality of endpoints continue transmitting videoconference data in the first videoconference, wherein the videoconference data of the plural subset is not transmitted to the remaining subset; and wherein a multipoint control unit (MCU) performs decoding and encoding operations on video information transmitted in the first videoconference, wherein said transmitting does not involve the MCU, and wherein the MCU does not encode and decode the first videoconference information.

2. The memory medium of claim 1, wherein a multipoint control unit (MCU) transmits the videoconference data of the first videoconference during the private videoconference.

3. The memory medium of claim 1, wherein the input is received by the first endpoint of the plural subset.

4. The memory medium of claim 1, wherein the input is received via a graphical user interface provided by the first endpoint.

5. The memory medium of claim 1, wherein the program instructions are further executable to:
end the private videoconference between the plural subset of the plurality of endpoints, wherein said ending comprises rejoining the plural subset with the remaining subset in the first videoconference.

6. The memory medium of claim 1, wherein the remaining subset of videoconferencing endpoints display text or a static image for at least one of the plural subset of videoconferencing endpoints during the private videoconference.

7. A method for conducting a private videoconference within a first videoconference, comprising:
performing, by a first videoconference endpoint, the first videoconference between a plurality of videoconference endpoints, wherein a multipoint control unit (MCU) performs decoding and encoding operations on video information transmitted in the first videoconference;
receiving, by the first videoconference endpoint, input requesting the private videoconference for a plural subset of the plurality of endpoints, wherein the plural subset comprises the first endpoint and one or more second endpoints, wherein the plural subset is not the entirety of the plurality of endpoints, and wherein the input is received during the first videoconference;
initiating, by the first videoconference endpoint, the private videoconference between the plural subset of the plurality of videoconference endpoints, wherein said initiating the private videoconference does not end the first videoconference;
transmitting, by the first videoconference endpoint, first videoconference information to one or more second videoconference endpoints of the plural subset to conduct the private videoconference, wherein said transmitting does not involve the MCU, and wherein the MCU does not encode and decode the first videoconference information.

8. The method of claim 7, wherein a multipoint control unit (MCU) transmits the videoconference data of the first videoconference during the private videoconference.

9. The method of claim 7, wherein the input is received by the first endpoint of the plural subset.

10. The method of claim 7, wherein the input is received via a graphical user interface provided by the first endpoint.

11. The method of claim 7, further comprising:
ending the private videoconference between the plural subset of the plurality of endpoints, wherein said ending comprises rejoining the plural subset with the remaining subset in the first videoconference.

12. The method of claim 7, wherein the remaining subset of videoconferencing endpoints display text or a static image for at least one of the plural subset of videoconferencing endpoints during the private videoconference.

13. A videoconferencing endpoint configured to conduct a private videoconference within a first videoconference, comprising:
a processor;
a network port coupled to the processor, wherein the network port is configured to couple to a plurality of videoconferencing endpoints over a network;
a memory medium coupled to the processor, wherein the memory medium stores program instructions executable by the processor:
perform the first videoconference between a plurality of endpoints using the network port;
receive input requesting the private videoconference for a plural subset of the plurality of endpoints, wherein the plural subset consists of the videoconferencing endpoint and one or more second endpoints, wherein the plural subset is not the entirety of the plurality of endpoints, and wherein the input is received during the first videoconference;
initiate the private videoconference between the plural subset of the plurality of endpoints, wherein said initiating the private videoconference does not end the first videoconference;
transmit, via the network port, first videoconference information directly to the second one or more endpoints of the plural subset during the private videoconference, wherein during the private videoconference, a remaining subset of the plurality of endpoints continue transmitting videoconference data in the first videoconference, wherein the videoconference data of the plural subset is not transmitted to the remaining subset; and
wherein a multipoint control unit (MCU) performs decoding and encoding operations on video information transmitted in the first videoconference, wherein said transmitting does not involve the MCU, and wherein the MCU does not encode and decode the first videoconference information.

14. The videoconferencing endpoint of claim 13, wherein a multipoint control unit (MCU) transmits the videoconference data of the first videoconference during the private videoconference.

15. The videoconferencing endpoint of claim 13, wherein the input is received via a graphical user interface provided by the videoconferencing endpoint.

16. The videoconferencing endpoint of claim 13, wherein the program instructions are further executable to:
end the private videoconference between the plural subset of the plurality of endpoints, wherein said ending comprises rejoining the plural subset with the remaining subset in the first videoconference.

17. The videoconferencing endpoint of claim 13, wherein the remaining subset of videoconferencing endpoints display text or a static image for at least one of the plural subset of videoconferencing endpoints during the private videoconference.

18. A method for conducting a private videoconference within a first videoconference, comprising:
performing, by a multipoint control unit (MCU), the first videoconference between a plurality of videoconference endpoints, wherein the MCU performs decoding and encoding operations on video information transmitted in the first videoconference;
receiving input, during the first videoconference, requesting the private videoconference for a plural subset of the plurality of videoconference endpoints, wherein the plural subset is not the entirety of the plurality of videoconference endpoints, and wherein the input is received during the first videoconference;
initiating the private videoconference between the plural subset of the plurality of videoconference endpoints, wherein said initiating the private videoconference does not end the first videoconference;
wherein during the private videoconference:
transmitting first videoconference information from a first videoconference endpoint of the plural subset to one or more second videoconference endpoints of the plural subset to conduct the private videoconference, wherein said transmitting does not involve the MCU, and wherein the MCU does not encode and decode the first videoconference information; and transmitting, by the MCU, second videoconference information from a first videoconference endpoint of a remaining subset to one or more second videoconference endpoints of the remaining subset to conduct the first videoconference, wherein the MCU encodes and decodes the second videoconference information;

wherein the first videoconference information of the plural subset is not transmitted to the remaining subset.

\* \* \* \* \*